US009553861B1

(12) United States Patent
Bogdanovic et al.

(10) Patent No.: US 9,553,861 B1
(45) Date of Patent: Jan. 24, 2017

(54) SYSTEMS AND METHODS FOR MANAGING ACCESS TO SERVICES PROVIDED BY WIRELINE SERVICE PROVIDERS

(71) Applicant: Juniper Networks, Inc., Sunnyvale, CA (US)

(72) Inventors: Ivica D. Bogdanovic, Brookline, MA (US); Jerome Moisand, Arlington, MA (US); Paul Raison, Windham, NH (US); Kenneth E. Culbert, Canton, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 330 days.

(21) Appl. No.: 14/229,781

(22) Filed: Mar. 28, 2014

(51) Int. Cl.
*H04L 29/06* (2006.01)

(52) U.S. Cl.
CPC ..................... *H04L 63/08* (2013.01)

(58) Field of Classification Search
CPC .................... H04L 63/08; H04L 63/10–63/108
See application file for complete search history.

(56) References Cited

U.S. PATENT DOCUMENTS

| 8,675,488 | B1* | 3/2014 | Sidebottom | H04L 67/141 370/229 |
| 2011/0302315 | A1* | 12/2011 | Galvin | H04L 63/0823 709/228 |
| 2013/0111549 | A1* | 5/2013 | Sowatskey | H04L 63/0823 726/3 |
| 2014/0003334 | A1* | 1/2014 | Hoggan | H04L 63/107 370/328 |
| 2014/0215066 | A1* | 7/2014 | Kamat | H04L 63/08 709/225 |
| 2015/0092551 | A1* | 4/2015 | Moisand | H04L 12/4633 370/235 |

OTHER PUBLICATIONS

Chiba, M. et al., "Dynamic Authorization Extensions to Remote Authentication Dial in User Service (RADIUS)", https://tools.ietf.org/html/rfc5176, as accessed Jan. 21, 2014, Request for Comments: 5176, (Jan. 2008).

* cited by examiner

*Primary Examiner* — Matthew Smithers
(74) *Attorney, Agent, or Firm* — FisherBroyles, LLP

(57) ABSTRACT

A computer-implemented method for managing access to services provided by wireline service providers may include (1) receiving at least one request from a subscriber device to authorize access to at least one service, (2) authenticating the subscriber device with an access gateway of a wireline service provider based at least in part on the request, (3) generating a unique session identifier that uniquely identifies the subscriber device during a service-access session, (4) delivering the unique session identifier to a management server of the wireline service provider to enable the management server to authenticate the subscriber device with at least one network device that provides the service based at least in part on the unique session identifier, and then (5) facilitating access by the subscriber device to the service provided by the network device during the service-access session. Various other systems, methods, and computer-readable media are also disclosed.

20 Claims, 6 Drawing Sheets

| Service Table 214 ||
|---|---|
| SERVICE | HOSTING DEVICE |
| Service 122(1) | Network Device 216(1) |
| ⋮ | ⋮ |
| Service 122(N) | Network Device 216(1) |
| ⋮ | ⋮ |
| Service 218(1) | Network Device 216(N) |
| ⋮ | ⋮ |
| Service 218(N) | Network Device 216(N) |

SYSTEMS AND METHODS FOR MANAGING ACCESS TO SERVICES PROVIDED BY WIRELINE SERVICE PROVIDERS

BACKGROUND

Wireline service providers often provide their customers with access to the Internet and/or locally hosted services via wireline service networks. Unfortunately, conventional wireline service networks may be unable to facilitate access to some locally hosted services due at least in part to certain infrastructural and/or configurational constraints. For example, a wireline service provider's network may include a conventional access gateway (such as a broadband remote access server or broadband network gateway) that performs Layer 3 tiered service functions and hosts a parental-controls service. In this example, the conventional access gateway may authorize and/or filter customer Internet access subject to the terms of the parental-controls service. However, this conventional access gateway may be unable to authorize customer access to a parental-controls service hosted by a physically separate network device (such as a service delivery gateway) included in the wireline service provider's network.

The instant disclosure, therefore, identifies and addresses a need for improved systems and methods for managing access to distributed services provided by wireline service providers.

SUMMARY

As will be described in greater detail below, the instant disclosure generally relates to systems and methods for managing access to services provided by wireline service providers.

In one example, a computer-implemented method for managing access to services provided by wireline service providers may include (1) receiving, at an access gateway of a wireline service provider, at least one request to authenticate a subscriber device for access to at least one service provided by the wireline service provider, (2) authenticating the subscriber device at the access gateway of the wireline service provider based at least in part on the request, (3) generating a unique session identifier that uniquely identifies the authenticated subscriber device during a service-access session, (4) delivering the unique session identifier to a management server of the wireline service provider to enable the management server to authorize, based at least in part on the unique session identifier, at least one network device of the wireline service provider to provide the service to the subscriber device via the access gateway, and then upon delivering the unique session identifier to the management server, (5) facilitating access by the subscriber device to the service provided by the network device during the service-access session.

Similarly, a system for implementing the above-described method may include (1) a reception module that receives, at an access gateway of a wireline service provider, at least one request to authenticate a subscriber device for access to at least one service provided by the wireline service provider, (2) an authentication module that authenticates the subscriber device at the access gateway of the wireline service provider based at least in part on the request, (3) a generation module that generates a unique session identifier that uniquely identifies the authenticated subscriber device during a service-access session, (4) a delivery module that delivers the unique session identifier to a management server of the wireline service provider to enable the management server to authorize, based at least in part on the unique session identifier, at least one network device of the wireline service provider to provide the service to the subscriber device via the access gateway, and (5) an access module that facilitates access by the subscriber device to the service provided by the network device during the service-access session. The system may also include at least one processor that executes the reception module, the authentication module, the generation module, the delivery module, and the access module.

In an additional example, the above-described method may be encoded as computer-readable instructions on a non-transitory computer-readable medium. For example, a computer-readable medium may include one or more computer-executable instructions that, when executed by at least one processor of a computing device, cause the computing device to (1) receive, at an access gateway of a wireline service provider, at least one request to authenticate a subscriber device for access to at least one service provided by the wireline service provider, (2) authenticate the subscriber device at the access gateway of the wireline service provider based at least in part on the request, (3) generate a unique session identifier that uniquely identifies the authenticated subscriber device during a service-access session, (4) deliver the unique session identifier to a management server of the wireline service provider to enable the management server to authorize, based at least in part on the unique session identifier, at least one network device of the wireline service provider to provide the service to the subscriber device via the access gateway, and then (5) facilitate access by the subscriber device to the service provided by the network device of the wireline service provider during the service-access session.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
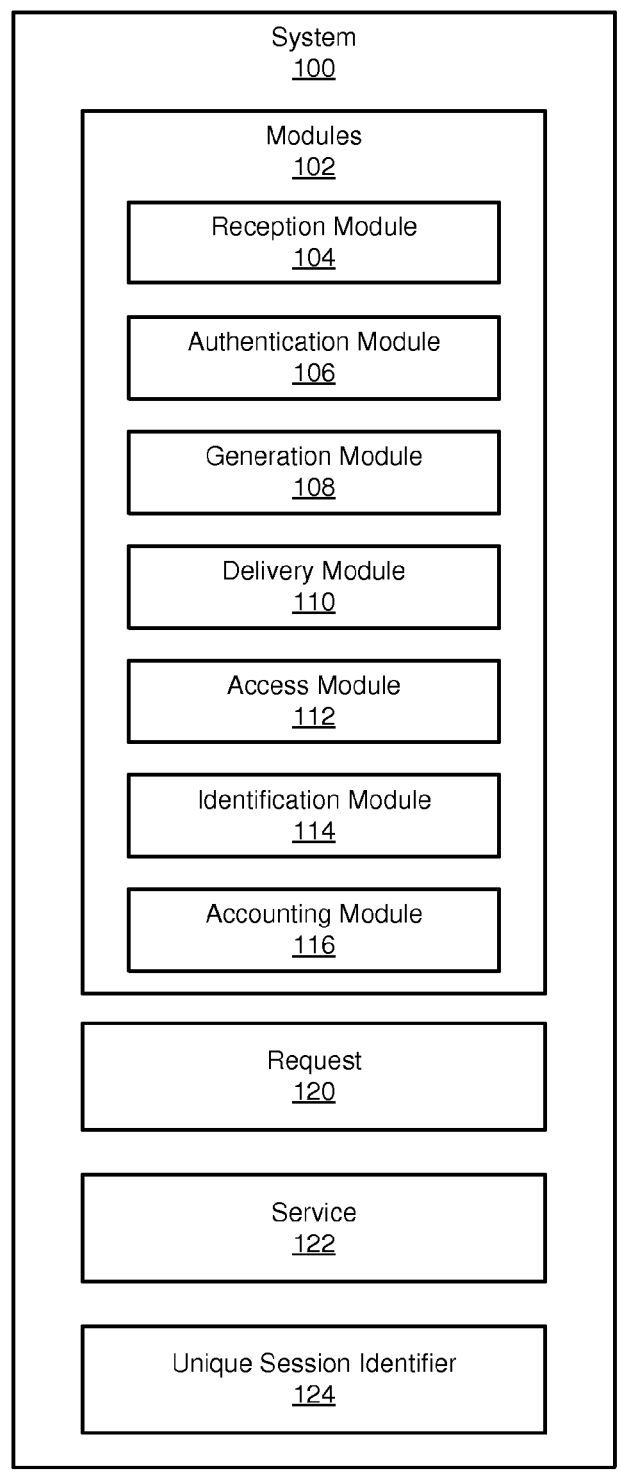
FIG. 1 is a block diagram of an exemplary system for managing access to services provided by wireline service providers.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various systems and methods for managing access to services provided by wireline service providers. As will be explained in greater detail below, upon authenticating a subscriber device with an access gateway of a wireline service provider, the various systems and methods described herein may generate a unique session identifier that identifies the authenticated subscriber device at the access gateway. The various systems and methods described herein may then deliver the unique session identifier to a management server of the wireline service provider. By delivering the unique session identifier to the management server, the various systems and methods described herein may enable the management server to authenticate and authorize the subscriber device with a network device that hosts a service.

In doing so, the various systems and methods described herein may facilitate access by the subscriber device to the service even though the service is hosted by the network device (as opposed to the access gateway). As a result, the subscriber device may be able to access the service from anywhere (including, e.g., a location other than the subscriber's residence and/or property) via any of the wireline service provider's access gateways. In other words, since the management server may authorize the subscriber device with the network device that hosts the service, the systems and methods described herein may enable the subscriber device to access the service even though the service is not hosted by the access gateway corresponding to the subscriber device's current location.

The term "wireline," as used herein, generally refers to any type or form of networking technology that establishes communication between a subscriber device and a service network via wiring, cabling, landlines, and/or fiber optics. Similarly, the phrase "wireline service provider," as used herein, generally refers to any type or form of company and/or entity that provides subscribers with access to the Internet and/or services via a wireline service network. Examples of such a wireline service provider include, without limitation, Internet Service Providers (ISPs), AT&T, VERIZON COMMUNICATIONS, CENTURYLINK, COMCAST, COX COMMUNICATIONS, TIME WARNER CABLE, WINDSTREAM COMMUNICATIONS, FRONTIER COMMUNICATIONS, FAIRPOINT COMMUNICATIONS, TDS TELECOM, CINCINNATI BELL, CONSOLIDATED COMMUNICATIONS, HAWAIIAN TELECOM, SHENTEL, LUMOS NETWORKS, HICKORYTECH, subsidiaries of one or more of the same, joint ventures of one or more of the same, or any other suitable wireline service provider.

Figure 2:
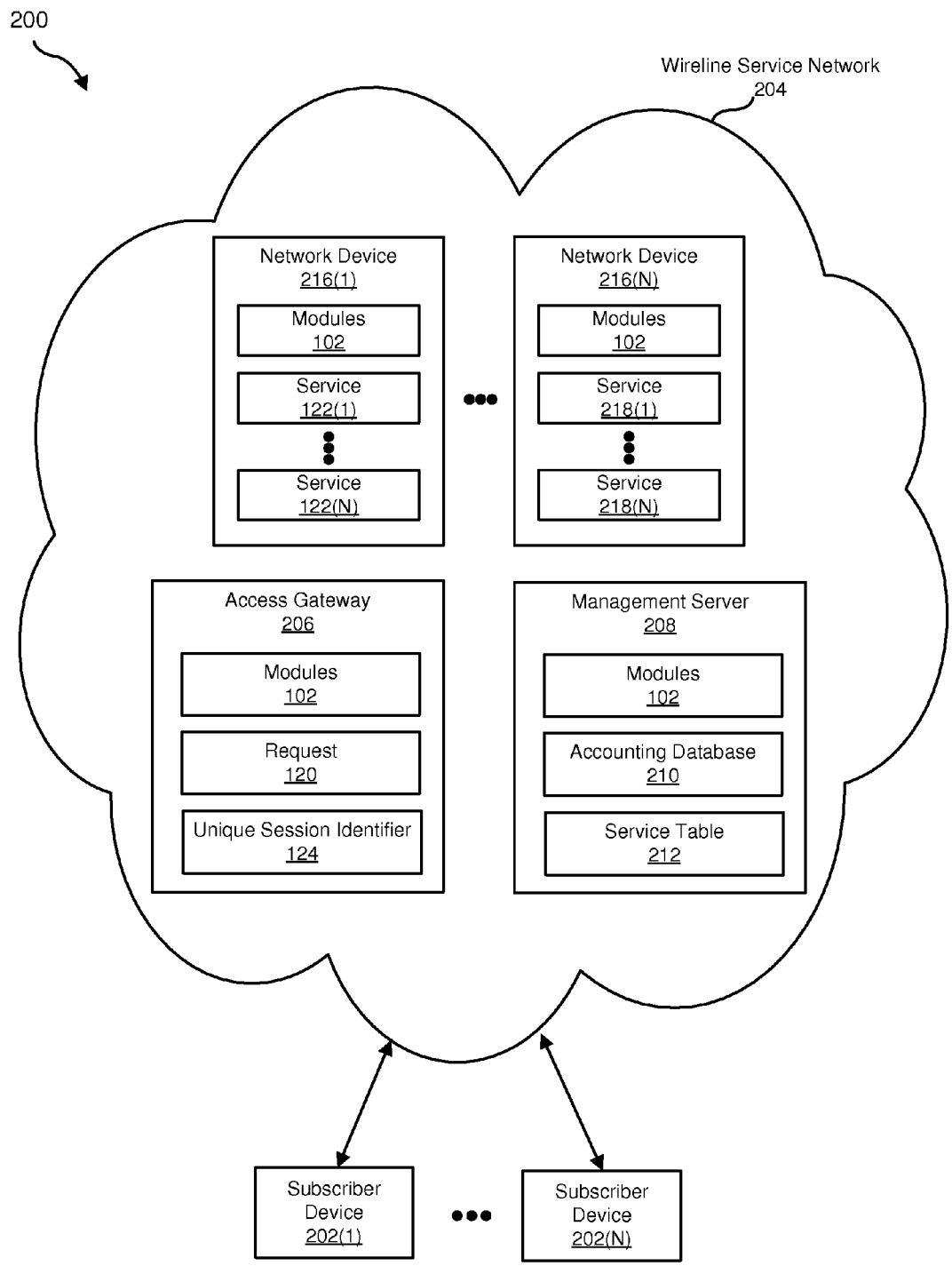
FIG. 2 is a block diagram of an exemplary system for managing access to services provided by wireline service providers.

The following will provide, with reference to FIGS. 1-2, detailed descriptions of exemplary systems for managing access to services provided by wireline service providers. Detailed descriptions of corresponding computer-implemented methods will be provided in connection with FIG. 3. Detailed descriptions of an exemplary authorization request and an exemplary unique session identifier will be provided in connection with FIG. 4. Detailed descriptions of an exemplary service table and an exemplary change-of-authorization request will be provided in connection with FIG. 5. In addition, detailed descriptions of an exemplary computing system capable of implementing one or more of the embodiments described herein will be provided in connection with FIG. 6.

FIG. 1 is a block diagram of an exemplary system 100 for managing access to services provided by wireline service providers. As illustrated in this figure, exemplary system 100 may include one or more modules 102 for performing one or more tasks. For example, and as will be explained in greater detail below, exemplary system 100 may include a reception module 104 that receives at least one request to authenticate a subscriber device for access to at least one service provided by the wireline service provider. Exemplary system 100 may also include an authentication module 106 that authenticates the subscriber device with an access gateway of the wireline service provider based at least in part on the request.

In addition, exemplary system 100 may include a generation module 108 that generates a unique session identifier that uniquely identifies the authenticated subscriber device during a service-access session. Exemplary system 100 may also include a delivery module 110 that delivers the unique session identifier to a management server of the wireline service provider to enable the management server to authorize, based at least in part on the unique session identifier, at least one network device of the wireline service provider to provide the service to the subscriber device via the access gateway. Exemplary system 100 may further include an access module 112 that facilitates access by the subscriber device to the service provided by the network device during the service-access session.

Moreover, and as will be described in greater detail below, exemplary system 100 may include an identification module 114 that identifies the network device that provides the service. Finally, exemplary system 100 may include an accounting module 116 that maintains an accounting database that identifies one or more statistics of services provided by network devices of the wireline service provider. Although illustrated as separate elements, one or more of modules 102 in FIG. 1 may represent portions of a single module or application (such as JUNIPER NETWORKS' JUNOS, CISCO SYSTEMS' INTERNETWORK OPERATING SYSTEM (IOS), and/or ALCATEL-LUCENT'S SERVICE ROUTER OPERATING SYSTEM (SR OS)).

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent software modules stored and configured to run on one or more computing devices, such as the devices illustrated in FIG. 2 (e.g., subscriber devices 202(1)-(N), access gateway 206, management server 208, and/or network devices 216(1)-(N)), and/or computing system 610 in FIG. 6.

As illustrated in FIG. 1, exemplary system 100 may also include one or more requests, such as request 120. In one embodiment, request 120 may be directed to requesting authorization to access one or more services provided by a wireline service provider. Additionally or alternatively, request 120 may be directed to requesting delivery of one or more services provided by a wireline service provider.

As illustrated in FIG. 1, exemplary system 100 may also include one or more services, such as service 122. The term "service," as used herein, generally refers to any type or form of software application, mechanism, and/or policy offered and/or provided to computing devices. In one embodiment, service 122 may represent a virtual and/or cloud-based service hosted by a network device. Additionally or alternatively, service 122 may represent a distributed service that is distributed across a plurality of network devices. Examples of services 218(1)-(N) include, without limitation, device-specific policies, device-specific services, parental-controls policies, security services, antivirus services, firewall services, media-delivery services, Video On Demand (VOD) services, Voice over Internet Protocol (VoIP) services, Internet Protocol TeleVision (IPTV) services, combinations of one or more of the same, or any other suitable services.

As illustrated in FIG. 1, exemplary system 100 may also include one or more unique session identifiers, such as unique session identifier 124. The phrase "unique session identifier," as used herein, generally refers to any type or form of identifier that uniquely identifies and/or represents a subscriber device during a service-access session. In one embodiment, unique session identifier 124 may be unique with respect to a specific authentication and/or authorization domain within wireline service network 204. Examples of unique session identifier 124 include, without limitation, numbers, addresses, hashes, fingerprints, checksums, MD5 checksums, secure hash algorithms, digital signatures, references, pointers, identifiers, combinations of one or more of the same, or any other suitable unique identifier.

The phrase "service-access session," as used herein, generally refers to any type or form of session and/or period during which a subscriber device engages in exchanges and/or transactions with a wireline service network. In one embodiment, a service-access session may include a fixed period of time. Additionally or alternatively, a service-access session may include an indefinite period of time.

Exemplary system 100 in FIG. 1 may be implemented in a variety of ways. For example, all or a portion of exemplary system 100 may represent portions of exemplary system 200 in FIG. 2. As shown in FIG. 2, system 200 may include a wireline service network 204 in communication with one or more subscriber devices 202(1)-(N).

In one embodiment, wireline service network 204 may include an access gateway 206, a management server 208, and/or one or more network devices 216(1)-(N). In this embodiment, access gateway 206 may be programmed with one or more of modules 102. Additionally or alternatively, access gateway 206 may include request 120 and/or unique session identifier 124. Although illustrated as a single device in FIG. 2, access gateway 206 may represent a plurality of access gateways included in wireline service network 204.

In one embodiment, network devices 216(1)-(N) may be programmed with one or more of modules 102. In this embodiment, network device 216(1) may host one or more services 122(1)-(N). Additionally or alternatively, network device 216(N) may host one or more services 218(1)-(N). Although illustrated as single devices in FIG. 2, each of network devices 216(1)-(N) may represent a plurality of network devices included in wireline service network 204.

In one embodiment, management server 208 may be programmed with one or more of modules 102. Additionally or alternatively, management server 208 may include an accounting database 210 and/or a service table 212. Although illustrated as a single device in FIG. 2, management server 208 may represent a plurality of management servers included in wireline service network 204.

The phrase "accounting database," as used herein, generally refers to any type or form of table and/or database that maintains, includes, and/or identifies statistics of services provided by a wireline service network. In one embodiment, accounting database 210 may identify one or more statistics of one or more of services 122(1)-(N) and/or 218(1)-(N).

The phrase "service table," as used herein, generally refers to any type or form of table and/or database that specifies and/or identifies services provided by network devices included in a wireline service network. In one embodiment, service table 212 may identify network device 216(1) as hosting services 122(1)-(N) within wireline service network 204. Additionally or alternatively, service table 212 may identify network device 216(N) as hosting services 218(1)-(N) within wireline service network 204. Service database 216 may facilitate looking up which network device is hosting a specific service based at least in part on the specific service.

In one embodiment, one or more of modules 102 from FIG. 1 may, when executed by one or more processors of access gateway 206, management server 208, and/or one or more of network devices 216(1)-(N), enable access gateway 206, management server 208, and/or one or more of network devices 216(1)-(N) to manage access to services provided by wireline service network 204. For example, and as will be described in greater detail below, one or more of modules 102 may cause access gateway 206 to (1) receive, at access gateway 206 of a wireline service provider, request 120 to authenticate subscriber device 202(1) for access to one or more of services 122(1)-(N) provided by the wireline service provider, (2) authenticate subscriber device 202(1) at access gateway 206 based at least in part on request 120, (3) generate unique session identifier 124 that uniquely identifies authenticated subscriber device 202(1) during a service-access session, (4) deliver unique session identifier 124 to management server 208 of the wireline service provider to enable management server 208 to authorize network device 216(1) of the wireline service provider to provide the one or more of services 122(1)-(N) to subscriber device 202(1) based at least in part on unique session identifier 124, and then (5) facilitate access by subscriber device 202(1) to the one or more of services 122(1)-(N) provided by network device 216(1) during the service-access session.

Subscriber devices 202(1)-(N) generally represent any type or form of computing device capable of reading computer-executable instructions. In one embodiment, subscriber devices 202(1)-(N) may be located remotely with respect to wireline service network 204. Each of subscriber devices 202(1)-(N) may correspond and/or belong to a specific subscriber of a wireline service provider. Examples of subscriber devices 202(1)-(N) include, without limitation, laptops, tablets, desktops, servers, cellular phones, Programmable Gate Arrays (FPGAs), Personal Digital Assistants (PDAs), multimedia players, embedded systems, wearable devices (e.g., smart watches, smart glasses, etc.), gaming consoles, portions of one or more of the same, combinations of one or more of the same, exemplary computing system 610 in FIG. 6, or any other suitable computing devices.

The term "subscriber," as used herein, generally refers to any type or form of customer of a wireline service provider. In one embodiment, a subscriber may represent an individual customer of a wireline service provider. Similarly, a subscriber may represent a household of users of the wireline service provider. Additionally or alternatively, a subscriber may represent a business that subscribes to the wireline service provider. Examples of such a subscriber include, without limitation, individuals, households, families, customers, clients, companies, organizations, businesses, entities, portions of one or more of the same, combinations of one or more of the same, or any other suitable subscriber.

Access gateway 206 generally represents any type or form of computing device capable of directing and/or routing network traffic. In one embodiment, access gateway 206 may interface wireline service network 204 with one or more of subscriber devices 202(1)-(N). Examples of access gateway 206 include, without limitation, Broadband Remote Access Servers (BRASes), Broadband Network Gateways (BNGs), routers, switches, network hubs, gateways, network default gateways, nodes, servers, bridges, FPGAs, laptops, tablets, desktops, cellular phones, PDAs, multimedia players, embedded systems, wearable devices, gaming consoles, exemplary computing system 610 in FIG. 6, portions of one or more of the same, combinations of one or more of the same, or any other suitable network device.

Management server 208 generally represents any type or form of computing device capable of authenticating and authorizing subscriber devices with network devices included in a wireline service network and/or tracking statistics of services provided by the network devices. Examples of management server 208 include, without limitation, Remote Authentication Dial In User Service (RADIUS) servers, Authentication Authorization and Accounting (AAA) servers, BRASes, BNGs, routers, switches, network hubs, gateways, network default gateways, nodes, servers, bridges, FPGAs, laptops, tablets, desktops, cellular phones, PDAs, multimedia players, embedded systems, wearable devices, gaming consoles, exemplary computing system 610 in FIG. 6, portions of one or more of the same, combinations of one or more of the same, or any other server.

Network devices 216(1)-(N) generally represents any type or form of computing device capable of hosting and/or delivering services. In one embodiment, network device 216(1) may host and/or deliver one or more of services 122(1)-(N) to one or more of subscriber devices 202(1)-(N) via access gateway 206. In this embodiment, network device 216(N) may host and/or deliver one or more of services 218(1)-(N) to one or more of subscriber devices 202(1)-(N) via access gateway 206. Additionally or alternatively, one or more of network devices 216(1)-(N) may interface wireline service network 204 with the Internet. Examples of network devices 216(1)-(N) include, without limitation, service delivery gateways, application servers, database servers, BRASes, BNGs, firewalls, Deep Packet Inspection (DPI) systems, routers, switches, network hubs, gateways, network default gateways, nodes, bridges, FPGAs, laptops, tablets, desktops, cellular phones, PDAs, multimedia players, embedded systems, wearable devices, gaming consoles, exemplary computing system 610 in FIG. 6, portions of one or more of the same, combinations of one or more of the same, or any other suitable service delivery gateway.

Wireline service network 204 generally represents any type or form of medium and/or architecture capable of facilitating communication or data transfer. In one embodiment, wireline service network 204 may include wireless and/or wired connections. Examples of wireline service network 204 include, without limitation, intranets, WANs, Local Area Networks (LANs), Personal Area Networks (PANs), the Internet, ISP networks, Power Line Communications (PLC) networks, cellular networks (e.g., Global System for Mobile Communications (GSM) networks), portions of one or more of the same, combinations of one or more of the same, or any other suitable wireline service network.

Figure 3:
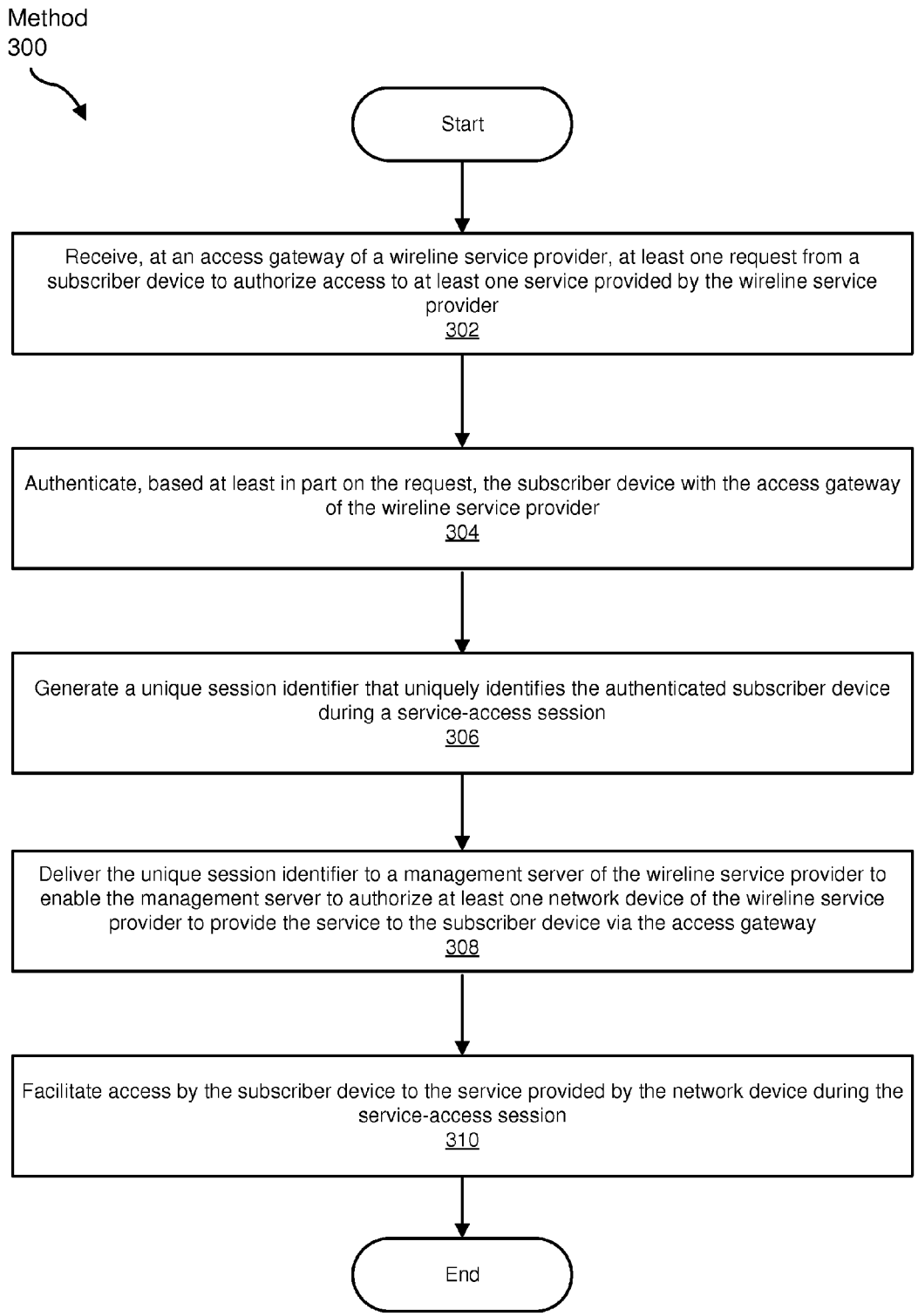
FIG. 3 is a flow diagram of an exemplary method for managing access to services provided by wireline service providers.

FIG. 3 is a flow diagram of an exemplary computer-implemented method 300 for managing access to services provided by wireline service providers. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, and/or computing system 610 in FIG. 6.

As illustrated in FIG. 3, at step 302 one or more of the systems described herein may receive at least one request to authenticate a subscriber device for access to at least one service provided by a wireline service provider. For example, reception module 104 may, as part of access gateway 206 included in wireline service network 204 in FIG. 2, receive request 120 from subscriber device 202(1). In this example, request 120 may request authentication of subscriber device 202(1) for access to one or more of services 122(1)-(N) and/or 218(1)-(N).

In one embodiment, this authentication may enable subscriber device 202(1) to access all of the services provided by wireline service network 204. Additionally or alternatively, this authentication may enable subscriber device 202(1) to access only certain authorized services available and/or offered to subscriber device 202(1).

The systems described herein may perform step 302 in a variety of ways. In some examples, reception module 104 may receive request 120 from subscriber device 202(1) while subscriber device 202(1) is located away from the subscriber's residence and/or property. For example, subscriber device 202(1) may attempt to access the Internet from an access point at a coffee shop located away from the subscriber's residence and/or property. As part of this attempt to access the Internet from the coffee shop, subscriber device 202(1) may issue request 120 to gain access to certain services provided by wireline service network 204.

Additionally or alternatively, reception module 104 may receive request 120 from subscriber device 202(1) while subscriber device 202(1) is located at the subscriber's residence and/or property. For example, subscriber device 202(1) may attempt to access a service hosted by wireline service network 204 from a Digital Subscriber Line (DSL) connection located at the subscriber's residence and/or property. As part of this attempt to access the service from the subscriber's residence and/or property, subscriber device 202(1) may issue request 120 to request access to the service.

Figure 4:
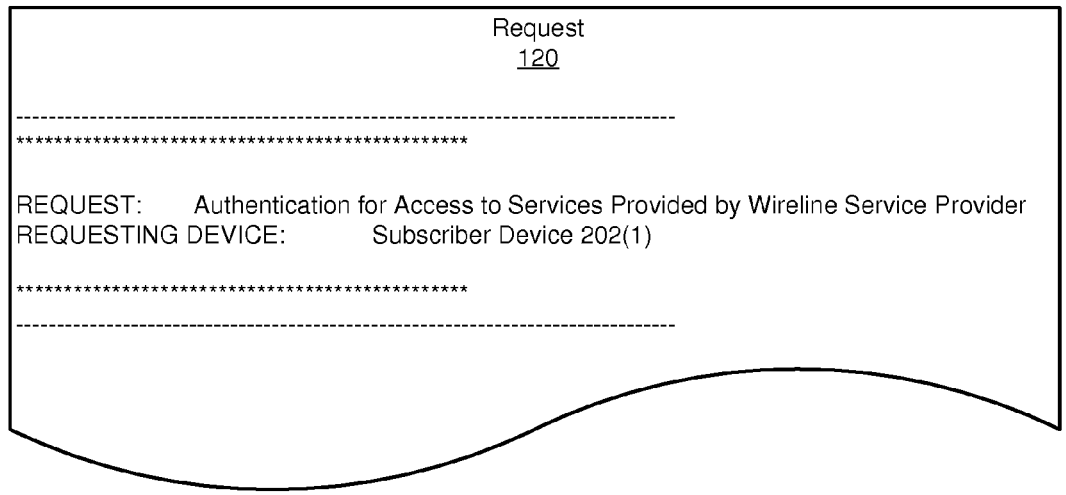
FIG. 4 is an illustration of an exemplary authorization request and an exemplary unique session identifier.
Figure 4:
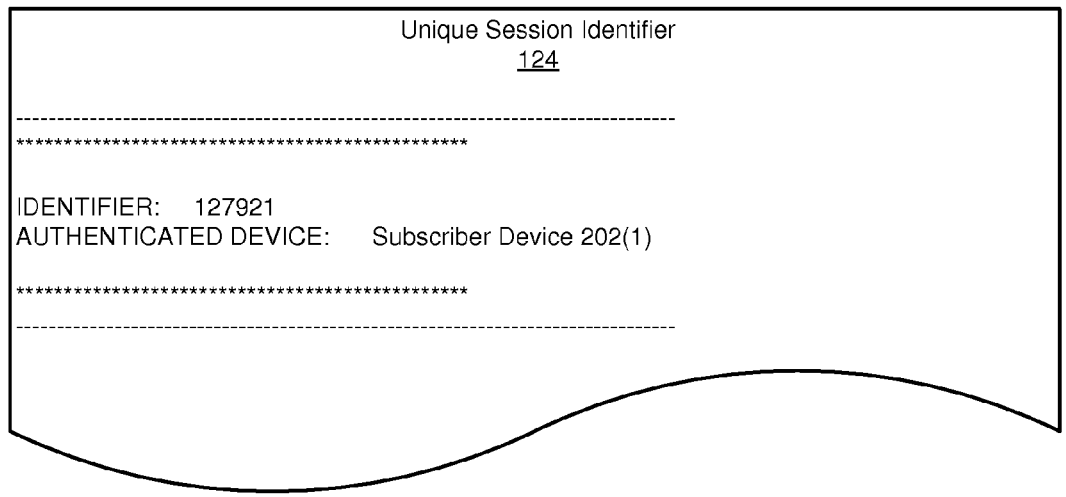

As illustrated in FIG. 4, request 120 may identify the nature of the request (in this example, "Authentication for Access to Services Provided by Wireline Service Provider") and/or the device that issued the request (in this example, "Subscriber Device 202(1)").

As illustrated in FIG. 3, at step 304 one or more of the systems described herein may authenticate the subscriber device with an access gateway of the wireline service provider based at least in part on the request. For example, authentication module 106 may, as part of access gateway 206 included in wireline service network 204 in FIG. 2, authenticate subscriber device 202(1) at access gateway 206 based at least in part on request 120. Once authentication module 106 has completed this authentication, access gateway 206 may prompt and/or direct management server 208 to authorize one or more of network devices 216(1)-(N) to provide services 122(1)-(N) and/or 218(1)-(N) to subscriber device 202(1).

The systems described herein may perform step 304 in a variety of ways. In some examples, authentication module 106 may authenticate subscriber device 202(1) at access gateway 206 based at least in part on user credentials included in request 120. For example, authentication module 106 may search request 120 for user credentials that identify the subscriber attempting to access the Internet via subscriber device 202(1). During this search, authentication module 106 may identify user credentials included in request 120.

Upon identifying these user credentials included in request 120, authentication module 106 may compare the identified user credentials against an authentication database (not illustrated in FIG. 2). During this comparison, authentication module 106 may determine that the identified user credentials match a set of known user credentials included in the authentication database. As a result, authentication module 106 may determine the identity and/or access privileges of the subscriber.

Upon determining the identity and/or access privileges of the subscriber, authentication module 106 may determine that the subscriber is allowed to access the Internet via wireline service network 204. Authentication module 106 may then authenticate subscriber device 202(1) with wireline service network 204 since the subscriber is allowed to access the Internet via wireline service network 204. In other words, by authenticating subscriber device 202(1) at access gateway 206, authentication module 106 may ensure that subscriber device 202(1) is implicitly authenticated across wireline service network 204.

In some examples, authentication module 106 may authenticate subscriber device 202(1) at access gateway 206 based at least in part on an source address included in request 120. For example, authentication module 106 may search request 120 for an Internet Protocol (IP) address assigned to the subscriber device that issued request 120. During this search, authentication module 106 may identify the IP address assigned to subscriber device 202(1) within request 120.

Upon identifying this IP address within request 120, authentication module 106 may compare the identified IP address against a range of known IP addresses assigned to subscribers of the wireline service provider. During this comparison, authentication module 106 may determine that the identified IP address matches a known IP address included in the range. As a result, authentication module 106 may determine the identity and/or access privileges of the subscriber attempting to access a service hosted by wireline service network 204 with subscriber device 202(1).

Upon determining the identity and/or access privileges of the subscriber, authentication module 106 may determine that the subscriber is authorized to access the service hosted by wireline service network 204. Authentication module 106 may then authenticate subscriber device 202(1) with wireline service network 204 since the subscriber is authorized to access the service hosted by wireline service network 204. In other words, by authenticating subscriber device 202(1) at access gateway 206, authentication module 106 may ensure that subscriber device 202(1) is implicitly authenticated across wireline service network 204.

Returning to FIG. 3, at step 306 one or more of the systems described herein may generate a unique session identifier that uniquely identifies the authenticated subscriber device during a service-access session. For example, generation module 108 may, as part of access gateway 206 included in wireline service network 204 in FIG. 2, generate unique session identifier 124 that uniquely identifies authenticated subscriber device 202(1) during a service-access session. In this example, generation module 108 may initiate the generation of unique session identifier 124 in response to the authentication of subscriber device 202(1) at access gateway 206.

The systems described herein may perform step 306 in a variety of ways. In some examples, generation module 108 may apply a formula that generates unique session identifier 124. For example, generation module 108 may generate unique session identifier 124 by incrementing the most recently assigned unique session identifier. In this example, generation module 108 may identify the unique session identifier most recently assigned to a subscriber device within wireline service network 204. Generation module 108 may then increment the value of this unique session identifier to arrive at unique session identifier 124.

In some examples, generation module 108 may apply an algorithm that generates unique session identifier 124. For example, generation module 108 may apply a hash function to the MAC address of subscriber device 202(1). This hash function may generate a hash based at least in part on the MAC address of subscriber device 202(1). Generation module 108 may then use this hash as unique session identifier 124.

In some examples, generation module 108 may ensure that unique session identifier 124 does not overlap with any active unique session identifiers. For example, access gateway 206 may maintain a list of active unique session identifiers currently being used to uniquely identify authenticated subscriber devices. In this example, generation module 108 may guarantee the uniqueness of unique session identifier 124 relative to the list of active unique session identifiers. Accordingly, generation module 108 may ensure that unique session identifier 124 is not currently being used to uniquely identify and/or represent any device other than subscriber device 202(1).

As illustrated in FIG. 4, unique session identifier 124 may identify the identifier (in this example, "127921") and/or the authenticated subscriber device uniquely identified and/or represented by the identifier (in this example, "Subscriber Device 202(1)").

Returning to FIG. 3, at step 308 one or more of the systems described herein may deliver the unique session identifier to a management server of the wireline service provider to enable the management server to authorize at least one network device to provide the service to the subscriber device based at least in part on the unique session identifier. For example, delivery module 110 may, as part of access gateway 206 included in wireline service network 204 in FIG. 2, deliver unique session identifier 124 to management server 208. By delivering unique session identifier 124 to management server 208, delivery module 110 may enable management server 208 to authorize one or more of network devices 216(1)-(N) to provide services 122(1)-(N) and 218(1)-(N) to subscriber device 202(1). Delivery module 110 may initiate this delivery of unique session identifier 124 in response to the authentication of subscriber device 202(1) at access gateway 206.

The systems described herein may perform step 308 in a variety of ways. In some examples, delivery module 110 may notify management server 208 that subscriber device 202(1) has been authenticated at access gateway 206 based at least in part on unique session identifier 124. For example, delivery module 110 may direct access gateway 206 to provide unique session identifier 124 to management server 208 via wireline service network 204. Upon receiving unique session identifier 124 from access gateway 206, management server 208 may determine that the subscriber device uniquely identified and/or represented by unique session identifier 124 has been authenticated at access gateway 206.

In some examples, one or more of the systems described herein may receive the unique session identifier that identifies the authenticated subscriber device at the management server. For example, reception module 104 may, as part of management server 208 in FIG. 2, receive unique session identifier 124 that uniquely identifies and/or represents subscriber device 202(1) during the service-access session. In this example, management server 208 may know that unique session identifier 124 corresponds to subscriber device 202(1).

In some examples, one or more of the systems described herein may identify the network device that provides the service. In one example, identification module 114 may, as part of management server 208 in FIG. 2, identify network devices 216(1)-(N) as hosting services 218(1)-(N). For example, identification module 114 may identify service table 214 that specifies network devices 216(1)-(N) as hosting services 218(1)-(N). As illustrated in FIG. 4, service table 214 may identify a plurality of services provided by the wireline service provider (in this example, "service 122(1)," "service 122(N)," "service 218(1)," "service 218(N)," and so on) and the corresponding network devices that host these services on behalf of the wireline service provider (in this example, "network device 216(1)," "network device 216(1)," "network device 216(N)," "network device 216(N)," and so on).

Upon identifying service table 214, identification module 114 may determine which network devices are providing services 218(1)-(N). For example, identification module 114 may look up services 122(1)-(N) in service table 214. By looking up services 122(1)-(N) in service table 214, identification module 114 may determine that network device 216(1) is hosting services 122(1)-(N).

Additionally or alternatively, identification module 114 may look up services 218(1)-(N) in service table 214. By looking up services 218(1)-(N) in service table 214, identification module 114 may determine that network device 216(N) is hosting services 218(1)-(N).

Additionally or alternatively, identification module 114 may use service table 214 to identify each network device that provides at least one service within wireline service network 204. For example, identification module 114 may scan service table 214 in its entirety. By so scanning service table 214, identification module 114 may identify each network device hosting at least one service within wireline service network 204.

In some examples, one or more of the systems described herein may deliver the unique session identifier to the network device that provides the service upon identification of the network device. For example, delivery module 110 may, as part of management server 208 in FIG. 2, deliver unique session identifier 124 to one or more of network devices 216(1)-(N). By delivering unique session identifier 124 to one or more of network devices 216(1)-(N), delivery module 110 may facilitate authorizing such network devices to provide one or more of services 122(1)-(N) and/or 218(1)-(N) to subscriber device 202(1) via access gateway 206 during the service-access session.

In one example, delivery module 110 may notify one or more of network devices 216(1)-(N) that subscriber device 202(1) has been authenticated with wireline service network 204 based at least in part on unique session identifier 124. For example, delivery module 110 may direct management server 208 to provide unique session identifier 124 to one or more of network devices 216(1)-(N) via wireline service network 204. Upon reception of unique session identifier 124 at such network devices, subscriber device 202(1) may be authorized to access one or more of services 122(1)-(N) and/or 218(1)-(N) during the service-access session.

Additionally or alternatively, delivery module 110 may deliver unique session identifier 124 to each of network devices 216(1)-(N) within wireline service network 204. By delivering unique session identifier 124 to each of network devices 216(1)-(N), delivery module 110 may ensure that subscriber device 202(1) is authorized to access each of services 122(1)-(N) and 218(1)-(N) during the service-access session.

In one example, generation module 108 may generate a change-of-authorization request that directs one or more of network devices 216(1)-(N) to provide one or more of services 122(1)-(N) and/or 218(1)-(N) to subscriber device 202(1) identified by unique session identifier 124. The phrase "change-of-authorization request," as used herein, generally refers to any type or form of request that facilitates changing attributes, characteristics, and/or instructions of a network device. For example, generation module 108 may generate a change-of-authorization request 500 in FIG. 5. Upon generation of change-of-authorization request 500, delivery module 110 may deliver change-of-authorization request 500 to one or more of network devices 216(1)-(N) via wireline service network 204.

Figure 5:
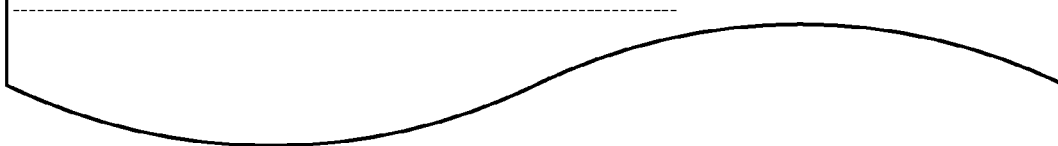
FIG. 5 is an illustration of an exemplary service table and an exemplary change-of-authorization request.

As illustrated in FIG. 5, change-of-authorization request 500 may identify the nature of the request (in this example, "Provide Access By the Authenticated Device to Hosted Services"), the unique session identifier of the authenticated device (in this example, "127921"), and/or the authenticated device (in this example, "Subscriber Device 202(1)").

In one example, generation module 108 may generate another change-of-authorization request that directs one or more of network devices 216(1)-(N) to modify one or more of services 122(1)-(N) and/or 218(1)-(N). For example, generation module 108 may generate a change-of-authorization request (not illustrated in FIG. 5) that does not include a unique session identifier. Instead, this change-of-authorization request may include one or more Vender Specific Attributes (VSAs) that direct one or more of network devices 216(1)-(N) to modify one or more of services 122(1)-(N) and/or 218(1)-(N).

Upon generation of this other change-of-authorization request, delivery module 110 may the other change-of-authorization request to one or more of network devices 216(1)-(N) via wireline service network 204. Examples of modifications directed by VSAs include, without limitation, deleting services, updating services, replacing services, removing subscribers' access from services, adding subscribers' access to services, combinations of one or more of the same, or any other suitable modifications.

In some examples, one or more of the systems described herein may receive the unique session identifier that identifies the authenticated subscriber device at the network device. For example, reception module 104 may, as part of one or more of network devices 216(1)-(N) in FIG. 2, receive unique session identifier 124 that identifies authenticated subscriber device 202(1). In this example, reception module 104 may receive unique session identifier 124 as part of change-of-authorization request 500.

In one example, reception module 104 may receive change-of-authorization request 500 from management server 208. Upon reception of change-of-authorization request 500, identification module 114 may parse changeof-authorization request 500 in search of a unique session identifier. While parsing, identification module 114 may identify unique session identifier 124 within change-of-authorization request 500. Additionally or alternatively, identification module 114 may determine that change-of-authorization request 500 is directed to providing access by subscriber device 202(1) to hosted services.

In some examples, one or more of the systems described herein may receive the other change-of-authorization request at the network device. For example, reception module 104 may, as part of one or more of network devices 216(1)-(N) in FIG. 2, receive the other change-of-authorization request from management server 208. In this example, the other change-of-authorization request may direct one or more of network devices 216(1)-(N) to modify one or more of services 122(1)-(N) and/or 218(1)-(N).

Upon reception of the other change-of-authorization request, identification module 114 may parse the other change-of-authorization request in search of a unique session identifier. While parsing, identification module 114 may be unable to identify a unique session identifier within the other change-of-authorization request. Identification module 114 may, however, identify one or more VSAs included in the other change-of-authorization request.

In some examples, one or more of the systems described herein may modify the service provided by the network device based at least in part on the other change-of-authorization request. For example, access module 112 may, as part of one or more of network devices 216(1)-(N) in FIG. 2, modify one or more of services 218(1)-(N) based at least in part on the VSAs included in the other change-of-authorization request. In this example, access module 112 may delete one or more of services 122(1)-(N) and/or services 218(1)-(N) to account for the VSAs. Additionally or alternatively, access module 112 may update one or more of services 122(1)-(N) and/or services 218(1)-(N) to account for the VSAs.

Returning to FIG. 3, at step 310 one or more of the systems described herein may facilitate access by the subscriber device to the service provided by the network device of wireline service provider during the service-access session. For example, access module 112 may, as part of access gateway 206 and/or one or more of network device 216(1)-(N) in FIG. 2, facilitate access by subscriber device 202(1) to one or more of services 122(1)-(N) and/or 218(1)-(N) provided by wireline service network 204 during the service-access session. In this example, the access may involve subscriber device 202(1), access gateway 206, one or more of network devices 216(1)-(N), and/or wireline service network 204.

The systems described herein may perform step 310 in a variety of ways. In some examples, access module 112 may establish a mutually authenticated connection between subscriber device 202(1) and one or more of network devices 216(1)-(N). In one example, reception module 104 may receive at least one request from subscriber device 202(1) to access one or more of services 122(1)-(N) and/or 218(1)-(N). For example, reception module 104 may receive a request from subscriber device 202(1) to access service 122(1). Access module 112 may then add unique session identifier 124 to the request.

Upon adding unique session identifier 124 to the request, access module 112 may forward the request to network device 216(1). For example, access module 112 may direct access gateway 206 to forward the request to network device 216(1) via wireline service network 204. As the request reaches network device 216(1), reception module 104 may receive the request from access gateway 206. Identification module 114 may then identify unique session identifier 124 within the request and/or determine that the request is directed to accessing service 122(1).

In some examples, one or more of the systems described herein may complete the mutually authenticated connection at the network device that provides the service. For example, access module 112 may, as part of network device 216(1) in FIG. 2, complete the mutually authenticated connection based at least in part on the request. Upon completing the mutually authenticated connection at the network device, access module 112 may enable network device 216(1) to provide service 122(1) to subscriber device 202(1) via access gateway 206.

In response to the request, access module 112 may provide service 122(1) to subscriber device 202(1) during the service-access session. For example, access module 112 may direct network device 216(1) to provide service 122(1) to subscriber device 202(1) via the mutually authenticated connection. As a result, subscriber device 202(1) may receive and/or gain access to service 122(1) during the service-access session.

In some examples, both access gateway 206 and network device 216(1) may authorize, activate, control, regulate, and/or impact service 122(1) provided to subscriber device 202(1). For example, access module 112 may, as part of access gateway 206, enforce one or more network-related rules (such as Layer 3 protocol rules) on service 122(1) based at least in part on the access privileges of subscriber device 202(1). Additionally or alternatively, access module 112 may, as part of network device 216(1), enforce one or more service-specific rules on service 122(1) based at least in part on the access privileges of subscriber device 202(1).

As a specific example, the access privileges of subscriber device 202(1) may enable subscriber device 202(1) to access the Internet at a data rate of 25 Megabits per second (Mbps) via access gateway 206. In this example, the access privileges of subscriber device 202(1) may also enable subscriber device 202(1) to access an Internet proxy service hosted by network device 216(1). Accordingly, network device 216(1) may provide the Internet proxy service to subscriber device 202(1) via access gateway 206. Subscriber device 202(1) may then access the Internet via this Internet proxy service at the data rate of 25 Mbps regulated by access gateway 206.

In some examples, one or more of the systems described herein may maintain an accounting database that identifies one or more statistics of services provided by network devices of the wireline service provider. For example, accounting module 116 may, as part of management server 208 in FIG. 2, maintain accounting database 210. In this example, accounting database 210 may identify and/or track statistics of one or more of services 122(1)-(N) and/or 218(1)-(N) provided by one or more of network devices 216(1)-(N) included in wireline service network 204.

In one example, reception module 104 may receive accounting updates that identify statistics of one or more of services 122(1)-(N) and/or 218(1)-(N) provided by one or more of network devices 216(1)-(N). For example, reception module 104 may, as part of management server 208 in FIG. 2, receive an accounting update from network device 216(1). In this example, the accounting update may identify at least one statistic of service 122(1) provided by network device 216(1).

Upon identification of the statistic, identification module 114 may identify at least one entry that corresponds to service 122(1) within accounting database 210. Accounting module 116 may then update the entry identified within accounting database 210 based at least in part on the statistic of service 122(1). In other words, accounting module 116 may modify the entry to account for the statistic identified in the accounting update.

As explained above in connection with exemplary method 300 in FIG. 3, a wireline service network may enable subscriber devices to access services hosted by service delivery gateways. In conventional wireline service networks, subscriber devices may be unable to access certain services hosted by these service delivery gateways. Instead, these subscriber devices may be able to access only services hosted by the BRAS and/or BNG assigned to the subscribers' residence and/or property. As a result, these subscriber devices may be unable to access the services hosted by the service delivery gateways while the subscriber is located away from his or her residence.

In an effort to address this deficiency, a wireline service network may enable subscriber devices to access services from locations other than the subscribers' residence and/or property. For example, a wireline service network may include a BRAS and/or BNG that authenticates a subscriber device on behalf of the entire wireline service network. In other words, the authentication performed at the BRAS and/or BNG may implicitly authenticate the subscriber device for all other network devices (e.g., a RADIUS server and/or one or more service delivery gateways) included in the wireline service network.

Upon authenticating the subscriber device, the BRAS and/or BNG may generate a unique session identifier that identifies the authenticated subscriber device. The BRAS and/or BNG may then deliver the unique session identifier to a RADIUS server included in the wireline service network. By delivering the unique session identifier to the RADIUS server, the BRAS and/or BNG may enable the RADIUS server to authorize a service delivery gateway hosting a service to provide the subscriber device with access to the service.

In doing so, the BRAS and/or BNG may facilitate access by the subscriber device to the service even though the service is hosted by the service delivery gateway (as opposed to the BRAS and/or BNG). As a result, the subscriber device may be able to access the service from a location other than the subscriber's residence and/or property. In other words, since the management server may authenticate the subscriber device with the service delivery gateway that hosts the service, the wireline service network may enable the subscriber device to access the service even though the service is not hosted by the BRAS and/or BNG corresponding to the subscriber device's current location.

Figure 6:
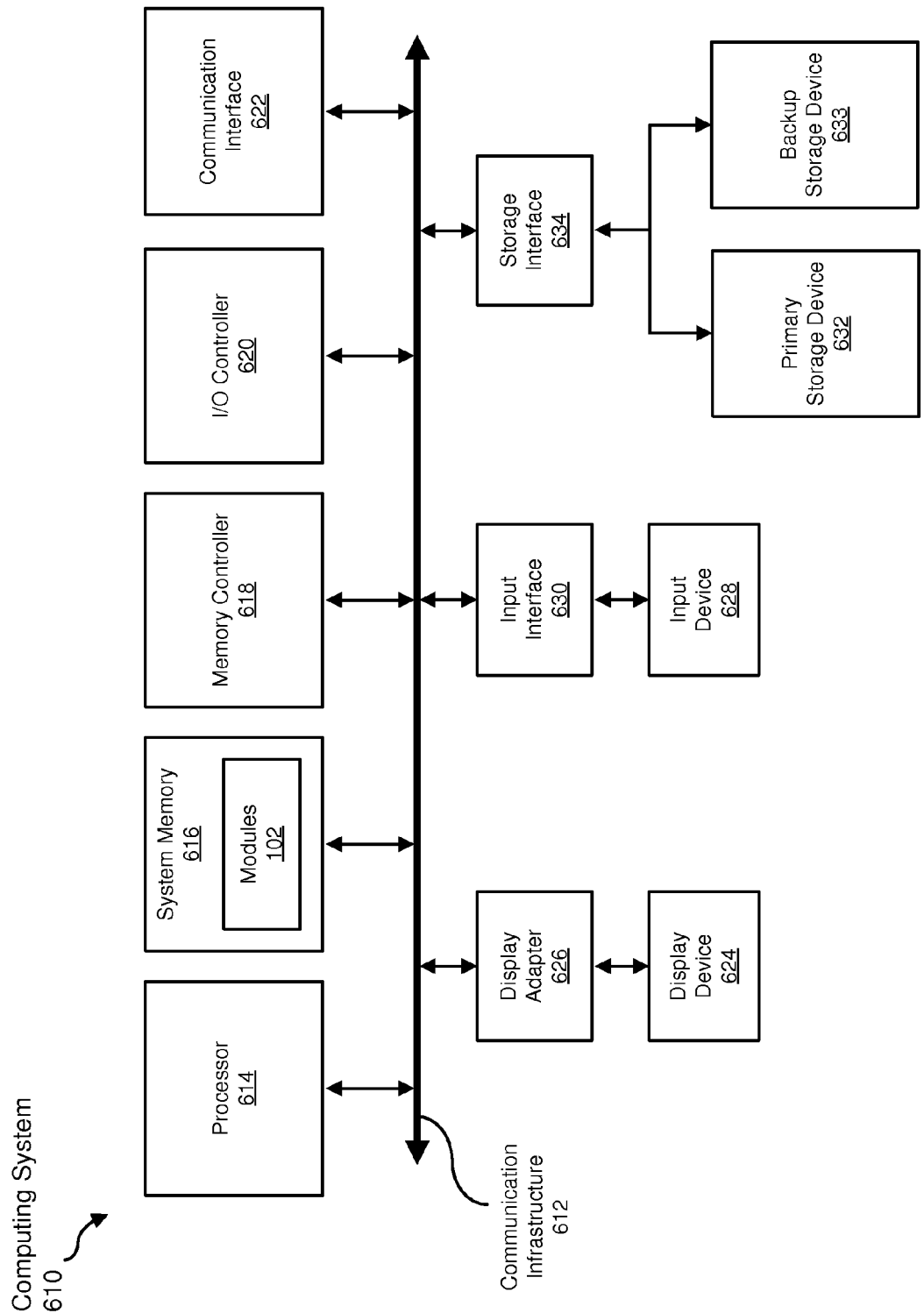
FIG. 6 is a block diagram of an exemplary computing system capable of implementing and/or being used in connection with one or more of the embodiments described and/or illustrated herein.

FIG. 6 is a block diagram of an exemplary computing system 600 capable of implementing and/or being used in connection with one or more of the embodiments described and/or illustrated herein. In some embodiments, all or a portion of computing system 600 may perform and/or be a means for performing, either alone or in combination with other elements, one or more of the steps described in connection with FIG. 3. All or a portion of computing system 600 may also perform and/or be a means for performing and/or implementing any other steps, methods, or processes described and/or illustrated herein.

Computing system 600 broadly represents any type or form of electrical load, including a single or multi-processor computing device or system capable of executing computer-readable instructions. Examples of computing system 600 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 600 may be programmed, configured, and/or otherwise designed to comply with one or more networking protocols. According to certain embodiments, computing system 600 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 600 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 600 may include various network and/or computing components. For example, computing system 600 may include at least one processor 614 and a system memory 616. Processor 614 generally represents any type or form of processing unit capable of processing data or interpreting and executing instructions. Processor 614 may represent an application-specific integrated circuit (ASIC), a system on a chip (e.g., a network processor), a hardware accelerator, a general purpose processor, and/or any other suitable processing element.

Processor 614 may process data according to one or more of the networking protocols discussed above. For example, processor 614 may execute or implement a portion of a protocol stack, may process packets, may perform memory operations (e.g., queuing packets for later processing), may execute end-user applications, and/or may perform any other processing tasks.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 600 may include both a volatile memory unit (such as, for example, system memory 616) and a non-volatile storage device (such as, for example, primary storage device 632, as described in detail below). System memory 616 may be implemented as shared memory and/or distributed memory in a network device. Furthermore, system memory 616 may store packets and/or other information used in networking operations.

In certain embodiments, exemplary computing system 600 may also include one or more components or elements in addition to processor 614 and system memory 616. For example, as illustrated in FIG. 6, computing system 600 may include a memory controller 618, an Input/Output (I/O)

controller 620, and a communication interface 622, each of which may be interconnected via communication infrastructure 612. Communication infrastructure 612 generally represents any type or form of infrastructure capable of facilitating communication between one or more components of a computing device. Examples of communication infrastructure 612 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 618 generally represents any type or form of device capable of handling memory or data or controlling communication between one or more components of computing system 600. For example, in certain embodiments memory controller 618 may control communication between processor 614, system memory 616, and I/O controller 620 via communication infrastructure 612. In some embodiments, memory controller 618 may include a Direct Memory Access (DMA) unit that may transfer data (e.g., packets) to or from a link adapter.

I/O controller 620 generally represents any type or form of device or module capable of coordinating and/or controlling the input and output functions of a computing device. For example, in certain embodiments I/O controller 620 may control or facilitate transfer of data between one or more elements of computing system 600, such as processor 614, system memory 616, communication interface 622, and storage interface 630.

Communication interface 622 broadly represents any type or form of communication device or adapter capable of facilitating communication between exemplary computing system 600 and one or more additional devices. For example, in certain embodiments communication interface 622 may facilitate communication between computing system 600 and a private or public network including additional computing systems. Examples of communication interface 622 include, without limitation, a link adapter, a wired network interface (such as a network interface card), a wireless network interface (such as a wireless network interface card), and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 622 may also represent a host adapter configured to facilitate communication between computing system 600 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also enable computing system 600 to engage in distributed or remote computing. For example, communication interface 622 may receive instructions from a remote device or send instructions to a remote device for execution.

As illustrated in FIG. 6, exemplary computing system 600 may also include a primary storage device 632 and/or a backup storage device 634 coupled to communication infrastructure 612 via a storage interface 630. Storage devices 632 and 634 generally represent any type or form of storage device or medium capable of storing data and/or other computer-readable instructions. For example, storage devices 632 and 634 may represent a magnetic disk drive (e.g., a so-called hard drive), a solid state drive, a floppy disk drive, a magnetic tape drive, an optical disk drive, a flash drive, or the like. Storage interface 630 generally represents any type or form of interface or device for transferring data between storage devices 632 and 634 and other components of computing system 600.

In certain embodiments, storage devices 632 and 634 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 634 may also include other similar structures or devices for allowing computer software, data, or other computer-readable instructions to be loaded into computing system 600. For example, storage devices 632 and 634 may be configured to read and write software, data, or other computer-readable information. Storage devices 632 and 634 may be a part of computing system 600 or may be separate devices accessed through other interface systems.

Many other devices or subsystems may be connected to computing system 600. Conversely, all of the components and devices illustrated in FIG. 6 need not be present to practice the embodiments described and/or illustrated herein. The devices and subsystems referenced above may also be interconnected in different ways from those shown in FIG. 6. Computing system 600 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for managing access to services provided by wireline service providers, at least a portion of the method being performed by a computing device comprising at least one processor, the method comprising:
    receiving, at an access gateway of a wireline service provider, at least one request to authenticate a subscriber device for access to at least one service provided by the wireline service provider, wherein the access gateway:
        interfaces a network of the wireline service provider with the subscriber device; and
        directs network traffic within the network of the wireline service provider;
    authenticating, based at least in part on the request, the subscriber device at the access gateway of the wireline service provider;
    in response to authenticating the subscriber device at the access gateway:
        generating a unique session identifier that uniquely identifies the authenticated subscriber device during a service-access session; and
        delivering the unique session identifier to a management server of the wireline service provider to enable the management server to authorize, based at least in part on the unique session identifier, at least one network device of the wireline service provider to provide the service to the subscriber device via the access gateway; and
    upon delivering the unique session identifier to the management server, facilitating access by the subscriber device to the service provided by the network device via the access gateway during the service-access session.

2. The method of claim 1, further comprising:
    receiving, at the management server, the unique session identifier that identifies the authenticated subscriber device;
    identifying the network device that provides the service; and
    upon identifying the network device that provides the service, delivering the unique session identifier to the network device to authorize the network device to provide the service to the subscriber device via the access gateway during the service-access session.

3. The method of claim 2, wherein identifying the network device that provides the service comprises:
    identifying, at the management server, a service table that specifies the network device that provides the service; and
    determining, by looking up the service in the service table, the network device that provides the service.

4. The method of claim 2, wherein delivering the unique session identifier to the network device comprises:
    generating a change-of-authorization request that directs the network device to provide the service to the subscriber device identified by the unique session identifier; and
    delivering the change-of-authorization request to the network device that provides the service.

5. The method of claim 2, wherein:
    identifying the network device that provides the service comprises identifying each network device that provides at least one service; and
    delivering the unique session identifier to the network device comprises delivering the unique session identifier to each network device to authorize each network device to provide at least one service to the subscriber device via the access gateway during the service-access session.

6. The method of claim 1, further comprising:
    receiving, at the network device, the unique session identifier that identifies the authenticated subscriber device; and
    authenticating, based at least in part on the unique session identifier, the subscriber device with the network device.

7. The method of claim 6, wherein facilitating access by the subscriber device to the service provided by the network device comprises:
    receiving, at the network device, at least one request from the subscriber device to access the service; and
    in response to receiving the request to access the service, providing the service to the subscriber device via the access gateway during the service-access session.

8. The method of claim 1, further comprising maintaining, at the management server, an accounting database that identifies one or more statistics of services provided by network devices of the wireline service provider.

9. The method of claim 8, wherein maintaining the accounting database comprises:

receiving, at the management server, at least one accounting update that identifies at least one statistic of the service provided by the network device;

identifying, within the accounting database, at least one entry that corresponds to the service provided by the network device; and updating, based at least in part on the accounting update, the entry identified within the accounting database.

10. The method of claim 1, wherein facilitating access by the subscriber device to the service provided by the network device comprises:

enforcing, at the access gateway, at least one network-related rule on the service based at least in part on one or more access privileges of the subscriber device; and enforcing, at the network device, at least one service-specific rule on the service based at least in part on the access privileges of the subscriber device.

11. A system for managing access to services provided by wireline service providers, the system comprising:

a reception module, stored in memory, that receives, at an access gateway of a wireline service provider, at least one request to authenticate a subscriber device for access to at least one service provided by the wireline service provider, wherein the access gateway:
  interfaces a network of the wireline service provider with the subscriber device; and
  directs network traffic within the network of the wireline service provider;

an authentication module, stored in memory, that authenticates, based at least in part on the request, the subscriber device at the access gateway of the wireline service provider;

a generation module, stored in memory, that generates a unique session identifier that uniquely identifies the authenticated subscriber device during a service-access session;

a delivery module, stored in memory, that delivers the unique session identifier to a management server of the wireline service provider to enable the management server to authorize, based at least in part on the unique session identifier, at least one network device of the wireline service provider to provide the service to the subscriber device via the access gateway;

an access module, stored in memory, that facilitates access by the subscriber device to the service provided by the network device via the access gateway during the service-access session; and at least one physical processor that executes the reception module, the authentication module, the generation module, the delivery module, and the access module.

12. The system of claim 11, wherein the reception module receives, at the management server, the unique session identifier that identifies the authenticated subscriber device;

further comprising an identification module, stored in memory, that identifies the network device that provides the service; and wherein the delivery module delivers the unique session identifier to the network device to authorize the network device to provide the service to the subscriber device via the access gateway during the service-access session.

13. The system of claim 12, wherein the identification module:

identifies, at the management server, a service table that specifies the network device that provides the service; and determines, by looking up the service in the service table, the network device that provides the service.

14. The system of claim 12, wherein:

the generation module generates a change-of-authorization request that directs the network device to provide the service to the subscriber device identified by the unique session identifier; and the delivery module delivers the change-of-authorization request to the network device that provides the service.

15. The system of claim 12, wherein:

the identification module identifies each network device that provides at least one service; and the delivery module delivers the unique session identifier to each network device to authorize each network device to provide at least one service to the subscriber device via the access gateway during the service-access session.

16. The system of claim 12, further comprising an accounting module that maintains, at the management server, an accounting database that identifies one or more statistics of services provided by network devices of the wireline service provider.

17. The system of claim 16, wherein:

the reception module receives, at the management server, at least one accounting update that identifies at least one statistic of the service provided by the network device;

the identification module that identifies, within the accounting database, at least one entry that corresponds to the service provided by the network device; and the accounting module updates, based at least in part on the accounting update, the entry identified within the accounting database.

18. The system of claim 11, wherein:

the reception module receive, at the network device, the unique session identifier that identifies the authenticated subscriber device; and the authentication module authenticating, based at least in part on the unique session identifier, the subscriber device with the network device.

19. The system of claim 18, wherein:

the reception module that receives, at the network device, at least one request from the subscriber device to access the service; and the access module provides the service to the subscriber device via the access gateway during the service-access session in response to the request to access the service.

20. A non-transitory computer-readable-storage medium comprising one or more computer-executable instructions that, when executed by at least one processor of a computing device, cause the computing device to:

receive, at an access gateway of a wireline service provider, at least one request from a subscriber device to authorize access to at least one service provided by the wireline service provider, wherein the access gateway:
  interfaces a network of the wireline service provider with the subscriber device; and
  directs network traffic within the network of the wireline service provider;

authenticate, based at least in part on the request, the subscriber device at the access gateway of the wireline service provider;

generate a unique session identifier that uniquely identifies the authenticated subscriber device during a service-access session;

deliver the unique session identifier to a management server of the wireline service provider to enable the management server to authenticate, based at least in part on the unique session identifier, the subscriber device with at least one network device of the wireline service provider that provides the service;

facilitate access by the subscriber device to the service provided by the network device of the wireline service provider via the access gateway during the service-access session.

\* \* \* \* \*

UNITED STATES PATENT AND TRADEMARK OFFICE
CERTIFICATE OF CORRECTION

PATENT NO. : 9,553,861 B1
APPLICATION NO. : 14/229781
DATED : January 24, 2017
INVENTOR(S) : Bogdanovic et al.

Page 1 of 1

It is certified that error appears in the above-identified patent and that said Letters Patent is hereby corrected as shown below:

In the Claims

Claim 18, at Column 22, Lines 34 to 37, should read:

The system of claim 11, wherein:
the reception module receives, at the network device, the unique session identifier that identifies the authenticated subscriber device; and Signed and Sealed this
Eleventh Day of April, 2017

Michelle K. Lee
*Director of the United States Patent and Trademark Office*